United States Patent
Delahanty et al.

(10) Patent No.: US 10,968,785 B2
(45) Date of Patent: Apr. 6, 2021

(54) WASTE HEAT RECOVERY SYSTEMS WITH HEAT EXCHANGERS

(71) Applicant: Cummins Inc., Columbus, IN (US)

(72) Inventors: Jared C. Delahanty, Morgantown, IN (US); Timothy C. Ernst, Columbus, IN (US); J. Steven Kolhouse, Columbus, IN (US); Brett A. Boas, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 16/614,659

(22) PCT Filed: May 9, 2018

(86) PCT No.: PCT/US2018/031873
§ 371 (c)(1),
(2) Date: Nov. 18, 2019

(87) PCT Pub. No.: WO2018/213080
PCT Pub. Date: Nov. 22, 2018

(65) Prior Publication Data
US 2020/0191020 A1    Jun. 18, 2020

Related U.S. Application Data

(60) Provisional application No. 62/507,449, filed on May 17, 2017.

(51) Int. Cl.
*F01K 23/06* (2006.01)
*F02M 26/22* (2016.01)
(Continued)

(52) U.S. Cl.
CPC ............ *F01K 23/065* (2013.01); *F01K 23/10* (2013.01); *F01M 1/02* (2013.01); *F01M 5/002* (2013.01);
(Continued)

(58) Field of Classification Search
CPC ....... F01K 23/065; F01K 23/10; F02M 26/22; F02M 26/23; F02M 26/30; F02M 26/32;
(Continued)

(56) References Cited

U.S. PATENT DOCUMENTS 3,103,978 A    9/1963   Alexander et al.
4,676,305 A *  6/1987   Doty .................... F28D 7/1653
                                                          165/158

(Continued)

FOREIGN PATENT DOCUMENTS

EP           3103978 A1    12/2016
WO       2016/069455 A1     5/2016

OTHER PUBLICATIONS

International Search Report and Written Opinion, issued by the ISA/US, Commissioner for Patents, dated Sep. 18, 2018, for International Application No. PCT/US2018/031873; 11 pages.

(Continued)

*Primary Examiner* — Hoang M Nguyen
(74) *Attorney, Agent, or Firm* — Faegre Drinker Biddle & Reath LLP

(57) ABSTRACT

A waste heat recovery system (100) is provided. At least one heat exchanger (104) is fluidically coupled to a waste heat source (102) and is configured for selectively recovering heat from the waste heat source (102) to heat a working fluid (108). An energy conversion device (112) is fluidically coupled to the at least one heat exchanger (104) and is configured to receive the working fluid (108) and to generate an energy for performing work or transferring the energy to another device using the heat recovered from the waste heat source (102). A condenser (122) is fluidically coupled to the energy conversion device (112) and configured to receive (Continued)

the working fluid (108) from the energy conversion device (112) and to condense the working fluid (108) into a liquid phase.

18 Claims, 4 Drawing Sheets

(51) Int. Cl.
| | |
|---|---|
| *F02M 26/23* | (2016.01) |
| *F02M 26/30* | (2016.01) |
| *F02M 26/32* | (2016.01) |
| *F01K 23/10* | (2006.01) |
| *F01M 1/02* | (2006.01) |
| *F01M 5/00* | (2006.01) |
| *F01N 5/02* | (2006.01) |
| *F01N 5/04* | (2006.01) |
| *F01P 3/18* | (2006.01) |
| *F01P 5/10* | (2006.01) |
| *F01P 11/00* | (2006.01) |
| *F02G 5/02* | (2006.01) |
| *F02G 5/04* | (2006.01) |
| *F22D 1/32* | (2006.01) |

(52) U.S. Cl.
CPC ............... *F01N 5/025* (2013.01); *F01N 5/04* (2013.01); *F01P 3/18* (2013.01); *F01P 5/10* (2013.01); *F01P 11/00* (2013.01); *F02G 5/02* (2013.01); *F02G 5/04* (2013.01); *F02M 26/22* (2016.02); *F02M 26/23* (2016.02); *F02M 26/30* (2016.02); *F02M 26/32* (2016.02); *F22D 1/32* (2013.01)

(58) Field of Classification Search
CPC .......... F01M 1/02; F01M 5/002; F01N 5/025; F01N 5/04; F01N 2240/02; F01N 5/02; F01P 3/18; F01P 5/10; F01P 11/00; F02G 5/02; F02G 5/04; F02G 5/00; F22D 1/32; Y02T 10/12
USPC ..................... 60/605.1, 605.2, 614, 616, 618
See application file for complete search history.

(56) References Cited

U.S. PATENT DOCUMENTS

| | | |
|---|---|---|
| 2009/0277154 A1 | 11/2009 | Wood |
| 2009/0320477 A1 | 12/2009 | Juchymenko |
| 2010/0156112 A1* | 6/2010 | Held ...................... F01K 7/165 290/1 A |
| 2010/0300093 A1 | 12/2010 | Doty |
| 2010/0319346 A1 | 12/2010 | Ast et al. |
| 2011/0154822 A1 | 6/2011 | Protz et al. |
| 2012/0192560 A1* | 8/2012 | Ernst ...................... F02M 26/25 60/616 |
| 2013/0175016 A1* | 7/2013 | Steele ...................... F28F 1/00 165/175 |
| 2014/0230761 A1 | 8/2014 | Pilavdzic |
| 2015/0159535 A1* | 6/2015 | Zigan .................... F01K 23/101 60/615 |
| 2015/0176466 A1 | 6/2015 | Son et al. |
| 2016/0061059 A1 | 3/2016 | Ernst et al. |
| 2016/0326914 A1 | 11/2016 | Bagayatkar |
| 2018/0135503 A1* | 5/2018 | Ernst ..................... F01K 23/101 |

OTHER PUBLICATIONS

International Preliminary Report on Patentability received for PCT Patent Application No. PCT/US2018/031873, dated Jun. 29, 2019, 18 pages.

* cited by examiner

WASTE HEAT RECOVERY SYSTEMS WITH HEAT EXCHANGERS

RELATED APPLICATIONS

The present application is a national stage application of International (PCT) Patent Application Serial No. PCT/US2018/031873, filed on May 9, 2018, which claims the benefit of U.S. Provisional Patent Application Ser. No. 62/507,449, filed on May 17, 2017, and entitled WASTE HEAT RECOVERY SYSTEMS WITH HEAT EXCHANGERS, the complete disclosures disclosure of which are expressly incorporated by reference herein

FIELD OF THE DISCLOSURE

The present disclosure generally relates to energy recovery systems, and more specifically to waste heat recovery systems with heat exchangers for internal combustion engines.

BACKGROUND OF THE DISCLOSURE

Internal combustion engines are available in a variety of different configurations. Some are spark-ignited wherein a mixture of air and fuel (e.g., gasoline) is delivered to each of the engine's cylinders and ignited by, for example, a spark plug at a specific time during the engine cycle to cause combustion. The combustion moves a piston in the cylinder, causing rotation of a crankshaft, which delivers power to a drivetrain. Other engines are compression-ignited wherein a mixture of air and fuel (e.g., diesel) is delivered to each of cylinder which combusts as a result of compression of the mixture in the cylinder during the compression stroke of the piston. During operation, the engines often generate more heat and energy than needed for operation of the piston, the crankshaft, and the drivetrain.

Conventional waste heat recovery systems to recover heat generated by the engines that would otherwise be lost through cooling and heat rejection provide means to improve engine efficiency. Heat is generally recovered from sources of high temperature, for example, the exhaust gas produced by the internal combustion engine (ICE), or compressed intake gas. Such high grade waste heat recovery systems include components which are configured to extract the heat from the high temperature source. These components can include exhaust gas recirculation (EGR) boilers, pre-charge air coolers (pre-CAC), exhaust system heat exchangers, or other components configured to extract heat from the high grade source of heat.

However, the conventional waste heat recovery systems do not offer higher levels of performance and are not as compact, or as easily integrated into existing applications. Drawbacks of the conventional waste heat recovery systems include high weight, high manufacturing and operation cost, and difficulties in assembly and fabrication. Accordingly, it is desirable to develop a waste heat recovery system that addresses one or more of the drawbacks mentioned above.

SUMMARY OF THE DISCLOSURE

In one embodiment, the present disclosure provides a waste heat recovery system. At least one heat exchanger is fluidically coupled to a waste heat source and is configured for selectively recovering heat from the waste heat source to heat a working fluid. At least one energy conversion device is fluidically coupled to the at least one heat exchanger and is configured to receive the working fluid and to generate an energy for performing work or transferring the energy to another device using the heat recovered from the waste heat source. A condenser is fluidically coupled to the at least one energy conversion device and is configured to receive the working fluid from the at least one energy conversion device and to condense the working fluid into a liquid phase. A recuperator is fluidically coupled to the at least one energy conversion device and is configured to receive the working fluid from the at least one energy conversion device and to communicate at least a portion of the working fluid to the at least one heat exchanger.

In one aspect of this embodiment, the at least one energy conversion device provides an electric or mechanical power using the generated energy. In one example, the energy conversion device can be one of: a piston expander, a screw expander, a scroll expander, a gerotor expander, and a turbine expander. In another example, the energy conversion device includes at least one of: a plurality of working fluid inlets and a plurality of working fluid outlets. The working fluid includes at least one of: water, ethanol, toluene, ethylene glycol, water and ethylene glycol mixture, oil, R245fa, low GWP replacements for R245fa, R1233zd(e), other hydrocarbon based working fluid, other hydrofluorocarbon based working fluids, oil, any mixtures of these working fluids. The at least one heat exchanger or the recuperator includes at least one of: a plurality of microtubes and a plurality of microchannels. The waste heat source includes at least one of: an exhaust, a recirculated exhaust (EGR), a coolant, a lubricant, a charge air, and any combination of the aforementioned sources (e.g., a mixed-charge, which is EGR and charge air mixed together).

In another aspect of this embodiment, an exhaust boiler is fluidically coupled to the at least one heat exchanger and is configured to receive the working fluid from the at least one heat exchanger and to evaporate the working fluid and communicate the evaporated working fluid to the at least one energy conversion device. The exhaust boiler is configured to extract the heat from an exhaust generated from an after-treatment device to heat the working fluid.

In yet another aspect of this embodiment, the recuperator includes a plurality of microtubes. The recuperator is fluidically coupled to the condenser, the at least one energy conversion device, and the at least one heat exchanger. The condenser is fluidically coupled to a sub-cooler which is fluidically coupled to the recuperator via a feed pump.

In another embodiment of the present disclosure, a waste heat recovery system has an exhaust gas recirculation (EGR) superheater and an EGR boiler, both being fluidically coupled together to a waste heat source and configured for selectively recovering heat from the waste heat source to heat a working fluid. At least one energy conversion device is fluidically coupled to the EGR superheater and the EGR boiler, and is configured to receive the working fluid and to generate an energy for performing work or transferring the energy to another device using the heat recovered from the waste heat source. A condenser is fluidically coupled to the at least one energy conversion device and is configured to receive the working fluid from the at least one energy conversion device and to condense the working fluid into a liquid phase, wherein at least one of the EGR superheater and the EGR boiler includes a plurality of microtubes.

In one aspect of this embodiment, the waste heat source includes at least one of: an exhaust, a recirculated exhaust (EGR), a coolant, a lubricant, a charge air, and any combination of the aforementioned sources. The heat from the exhaust is recovered by an exhaust boiler, the heat from the coolant is recovered by a coolant boiler, and the heat from the charge air is recovered by a charge cooler or a pre-charge air cooler. For example, the "charge cooler" would do all the cooling for the incoming engine air, and the "pre-charge cooler" would only do a portion of the cooling. The working fluid is fluidically communicated from the pre-charge air cooler to the EGR superheater via the exhaust boiler and the coolant boiler.

In another aspect of this embodiment, a recuperator is fluidically coupled to the at least one energy conversion device and is configured to receive the working fluid from the at least one energy conversion device and to communicate at least a portion of the working fluid to the condenser.

In yet another embodiment of the present disclosure, a waste heat recovery system includes an integrated exhaust gas recirculation (EGR) boiler/superheater fluidically coupled to a coolant boiler and configured for selectively recovering heat from the coolant boiler to heat a working fluid. At least one energy conversion device is fluidically coupled to the integrated EGR boiler/superheater and is configured to receive the working fluid and to generate an energy for performing work or transferring the energy to another device using the heat recovered from the coolant boiler. A condenser is fluidically coupled to the at least one energy conversion device and is configured to receive the working fluid from the at least one energy conversion device and to condense the working fluid into a liquid phase.

In one aspect of the embodiment, the coolant boiler is connected to a pump in fluid communication with an engine and a radiator for circulating a coolant. In another aspect of the embodiment, a turbine assembly is fluidically coupled to the at least one energy conversion device and is configured to generate the energy using the working fluid. The turbine assembly is fluidically coupled to the condenser for receiving the working fluid from the condenser. The turbine assembly includes a gearbox and a drive clutch, and is fluidically coupled to at least one of: an oil tank, an oil cooler, and an oil pump. The EGR boiler/superheater includes a plurality of microtubes.

In yet another embodiment of the present disclosure, a waste heat recovery system includes at least one heat exchanger having a plurality of microtubes and fluidically coupled to a waste heat source and configured for selectively recovering heat from the waste heat source to heat a working fluid. At least one energy conversion device is fluidically coupled to the at least one heat exchanger and is configured to receive the working fluid and to generate an energy for performing work or transferring the energy to another device using the heat recovered from the waste heat source. A condenser is fluidically coupled to the at least one energy conversion device and is configured to receive the working fluid from the at least one energy conversion device and to condense the working fluid into a liquid phase.

While multiple embodiments are disclosed, still other embodiments of the present disclosure will become apparent to those skilled in the art from the following detailed description, which shows and describes illustrative embodiments of the present disclosure. Accordingly, the drawings and detailed description are to be regarded as illustrative in nature and not restrictive.

BRIEF DESCRIPTION OF THE DRAWINGS

The above-mentioned and other features of this disclosure and the manner of obtaining them will become more apparent and the disclosure itself will be better understood by reference to the following description of embodiments of the present disclosure taken in conjunction with the accompanying drawings, wherein.

Figure 1:
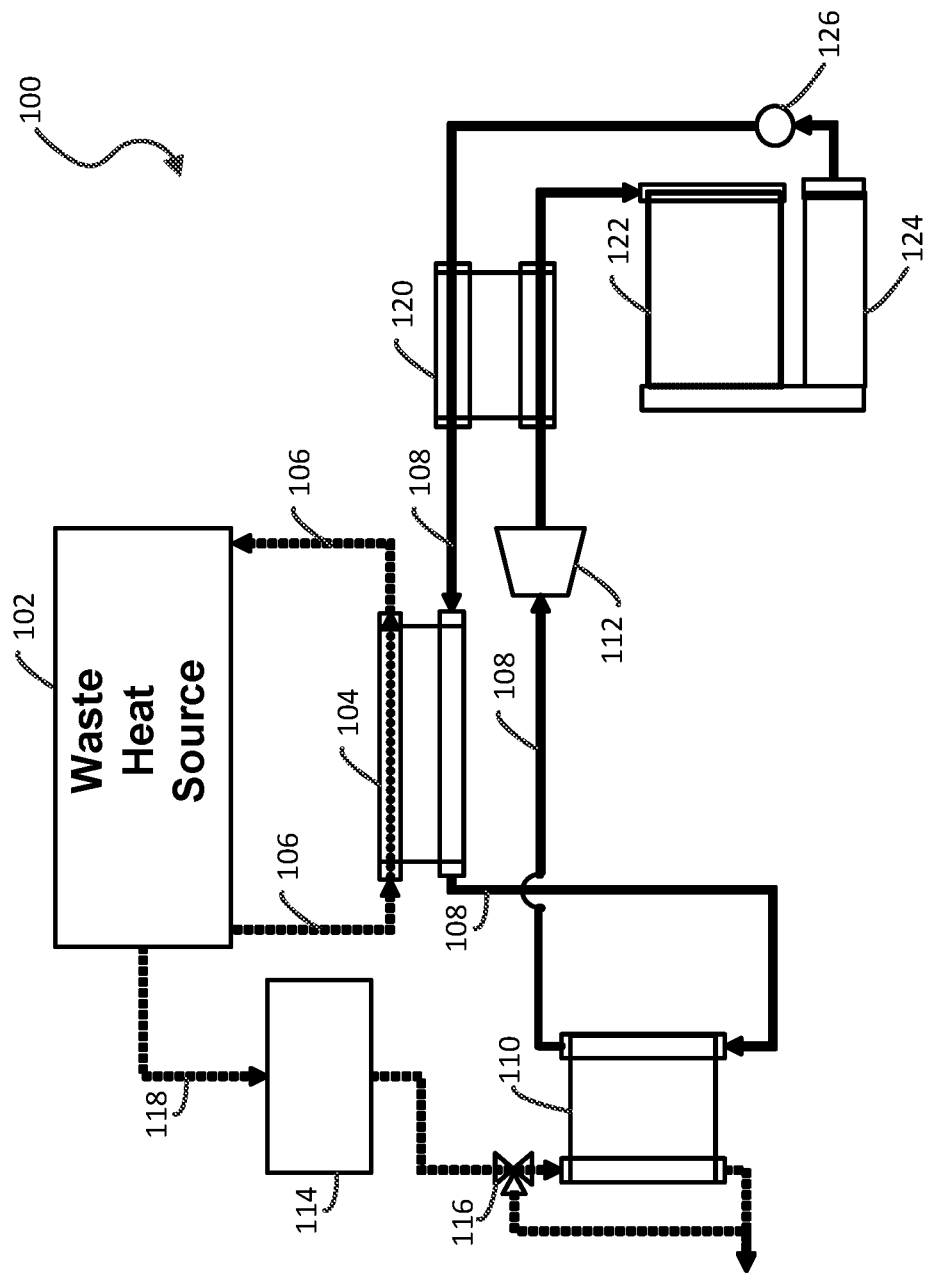
FIG. 1 is a schematic block diagram of a waste heat recovery system with a heat exchanger in accordance with embodiments of the present disclosure.

While the present disclosure is amenable to various modifications and alternative forms, specific embodiments have been shown by way of example in the drawings and are described in detail below. The intention, however, is not to limit the present disclosure to the particular embodiments described. On the contrary, the present disclosure is intended to cover all modifications, equivalents, and alternatives falling within the scope of the present disclosure as defined by the appended claims.

DETAILED DESCRIPTION OF EMBODIMENTS

In the following detailed description, reference is made to the accompanying drawings which form a part hereof, and in which is shown by way of illustration specific embodiments in which the present disclosure is practiced. These embodiments are described in sufficient detail to enable those skilled in the art to practice the present disclosure, and it is to be understood that other embodiments can be utilized and that structural changes can be made without departing from the scope of the present disclosure. Therefore, the following detailed description is not to be taken in a limiting sense, and the scope of the present disclosure is defined by the appended claims and their equivalents.

Examples of the waste heat recovery system described herein relate to waste heat recovery systems for use with engines using one or more heat exchangers, such as a coolant boiler. Examples of the waste heat recovery system described herein for extracting heat from a coolant can provide several benefits including, for example, (1) enhancing engine efficiency and fuel economy; (2) reducing an overall size of the recovery systems; (3) improving operation and/or manufacturing cost of the recovery systems; (4) extracting heat from the coolant which is otherwise lost to the environment for preheating and evaporating the working fluid; (5) selectively controlling the flow of coolant to either a heat exchanger or a radiator; and (6) preheating and evaporating a working fluid used in conjunction with high grade waste heat thereby increasing the power output of the waste heat recovery system.

Referring now to FIG. 1, an exemplary waste heat recovery system 100 according to an embodiment of the present disclosure is shown. Waste heat recovery system 100 includes a waste heat source 102 and at least one heat exchanger 104, both of which are fluidically coupled to each other for exchanging heat. For example, system 100 is configured to selectively recover heat from a coolant 106, which is a low grade heat source, based on an operating condition of waste heat source 102, such as an engine. Other exemplary waste heat recovery systems are also described in the commonly assigned U.S. Pat. Nos. 7,866,157; 8,544, 274; and 8,627,663, and International Application No. PCT/

US15/57329, the disclosures of all of which are incorporated by reference in their entireties. Possible waste heat sources 102 include an EGR, a coolant, a charge air, a mixed EGR and charge air (mixed-charge), an engine and/or waste heat recovery oil, an exhaust, and the like.

Waste heat source 102 can include an ICE, for example, a diesel engine, a gasoline engine, a natural gas engine, a positive displacement engine, a rotary engine, or any other suitable engine, which converts a fuel (e.g., diesel, gasoline, natural gas, biodiesel, ethanol any combination thereof or any other suitable fuel) into mechanical energy. The conversion produces heat which heats up an engine block or other housing component of the engine. To cool the engine, coolant 106 is pumped through the engine block or other housing of the engine. Coolant 106 can have a sufficient heat capacity to extract a substantial portion of the heat from the engine. Coolant 106 can include any suitable coolant, for example, a coolant suitable for use with a diesel engine.

Heat exchanger 104 can be, for example, a microtube or microchannel heat exchanger, and any number of combinations of microtube and microchannel heat exchangers are contemplated. In another example, heat exchanger 104 is constructed and arranged based on organic Rankine cycle (ORC) technologies, but can also be applied to other suitable waste heat recovery systems, such as Brayton cycle, Kalina cycle, absorption and/or adsorption cycle, and the like. In some embodiments, heat exchanger 104 recovers heat from engines (e.g., reciprocating, turbine, or the like) and generates mechanical and/or electrical power or other suitable work (e.g., refrigeration or air conditioning, etc.) from available waste heat sources.

For example, microtube heat exchangers can be used for waste heat recovery components, such as components receiving waste heat from engine sources (e.g., coolant boiler, EGR boiler/superheater, tailpipe boiler, charge-air-cooler, mixed-charge-cooler, engine oil cooler, waste heat recovery oil cooler, exhaust boiler, recuperator, condenser, subcooler, and the like). In another example, recuperative or efficiency-improving components (e.g., recuperator or waste heat recovery oil cooler) can also be used in association with a combustion portion of a gas turbine engine for increasing its overall efficiency. In yet another example, heat rejection components, such as a condenser and/or a subcooler, are used for employing an available liquid sink, such as chilled-water or for using a hydronic loop to connect the waste heat recovery condenser to an external air-cooled heat exchanger. In this configuration, system 100 provides a reduced system cost (e.g., a lower total cost of ownership and shorter payback for users), an increased performance (e.g., reduced vehicle emissions), and an easier installation in vehicles (e.g., a lower cost for system integration providing additional new applications and/or markets).

In FIG. 1, heat exchanger 104 is fluidically coupled to waste heat source 102 and configured to extract heat from coolant 106 to heat a working fluid 108. Working fluid 108 can include any suitable working fluid which can extract heat from the high grade heat source and change phase, for example, vaporize. Such coolants can include water, ethanol, ethylene glycol (e.g., an antifreeze agent), water and ethylene glycol mixture, oils, or any other suitable coolant. Furthermore, the coolant can include additives such as corrosion inhibitors, antifoam agents, dyes, and/or other additives. Suitable additives can include phosphates, silicates, borates, carboxylates, any other suitable additive or a combination thereof. For example, the working fluid can include, for example, Genetron® R-245fa from Honeywell, low-GWP alternatives of existing refrigerant based working fluids, such as R-1233zd(e) or the like, Therminol®, Dowtherm J™ from Dow Chemical Co., Fluorinol® from American Nickeloid, toluene, dodecane, isododecane, methylundecane, neopentane, neopentane, octane, water/methanol mixtures, ethanol steam, and other fluids suitable for the anticipated temperature ranges and for the materials used in the various described devices and systems, such as hydrocarbon based working fluids or hydrofluorocarbon based working fluids, may be used.

Heat exchanger 104 can include any suitable heat exchanger(s) which can extract heat from coolant 106 and communicate the heat to working fluid 108. A temperature of coolant 106 can be sufficient to preheat working fluid 108 and cause working fluid 108 to change phase (e.g., evaporate). In this example, heat exchanger 104 is configured to allow coolant 106 to flow through in a first direction, for example left to right along a longitudinal axis of heat exchanger 104 as shown in FIG. 1. Further, working fluid 108 flows through heat exchanger 104 in a second direction which is opposite the first direction, for example, from right to left. In other embodiments, heat exchanger 104 can be configured so that the first direction is the same as the second direction, i.e., coolant 106 and working fluid 108 flows through heat exchanger 104 parallel to each other in the same direction. Other suitable arrangements are also contemplated to suit different applications.

Heat exchanger 104 is also fluidically coupled to an optional exhaust boiler 110 configured to receive preheated working fluid 108 from heat exchanger 104 and to evaporate working fluid 108 and communicate the evaporated working fluid to an energy conversion device 112. Exhaust boiler 110 receives heat from an after-treatment device 114 via a control valve 116 (e.g., a three-way check valve) using tailpipe exhaust 118 generated from waste heat source 102. More specifically, heat exchanger 104 is configured to extract heat from a high grade heat source such as, an exhaust gas (e.g., diesel exhaust gas) from waste heat source 102, or a compressed intake gas communicated into waste heat source 102. The high grade heat source has a substantially higher peak temperature (e.g., in the range of about 550 degrees Fahrenheit to about 1,300 degrees Fahrenheit in certain embodiments) than a peak temperature of the coolant (e.g., in the range of about 180 degrees Fahrenheit to about 230 degrees Fahrenheit in certain embodiments).

Energy conversion device 112 receives the vaporized working fluid 108 and is configured to generate energy for performing additional work or transferring the energy to another device or system using the heat recovered from waste heat source 102. For example, energy conversion device 112 can include a turbine, piston, scroll, screw, gerotor or other type of expander devices that moves (e.g., rotates) as a result of expanding working fluid vapor to provide additional work. For example, the power of expander devices can be extracted mechanically via a gear or a belt drive or using an electric generator. In some embodiments, the additional work can be fed into the engine's driveline to supplement the engine's power either mechanically or electrically (e.g., by turning a generator), or it can be used to drive a generator and power electrical devices, parasitic devices or a storage battery (not shown). Alternatively, energy conversion device 112 can be used to transfer energy from one system to another system (e.g., to transfer heat energy from waste heat recovery system 100 to a fluid for a heating system).

Figure 3:
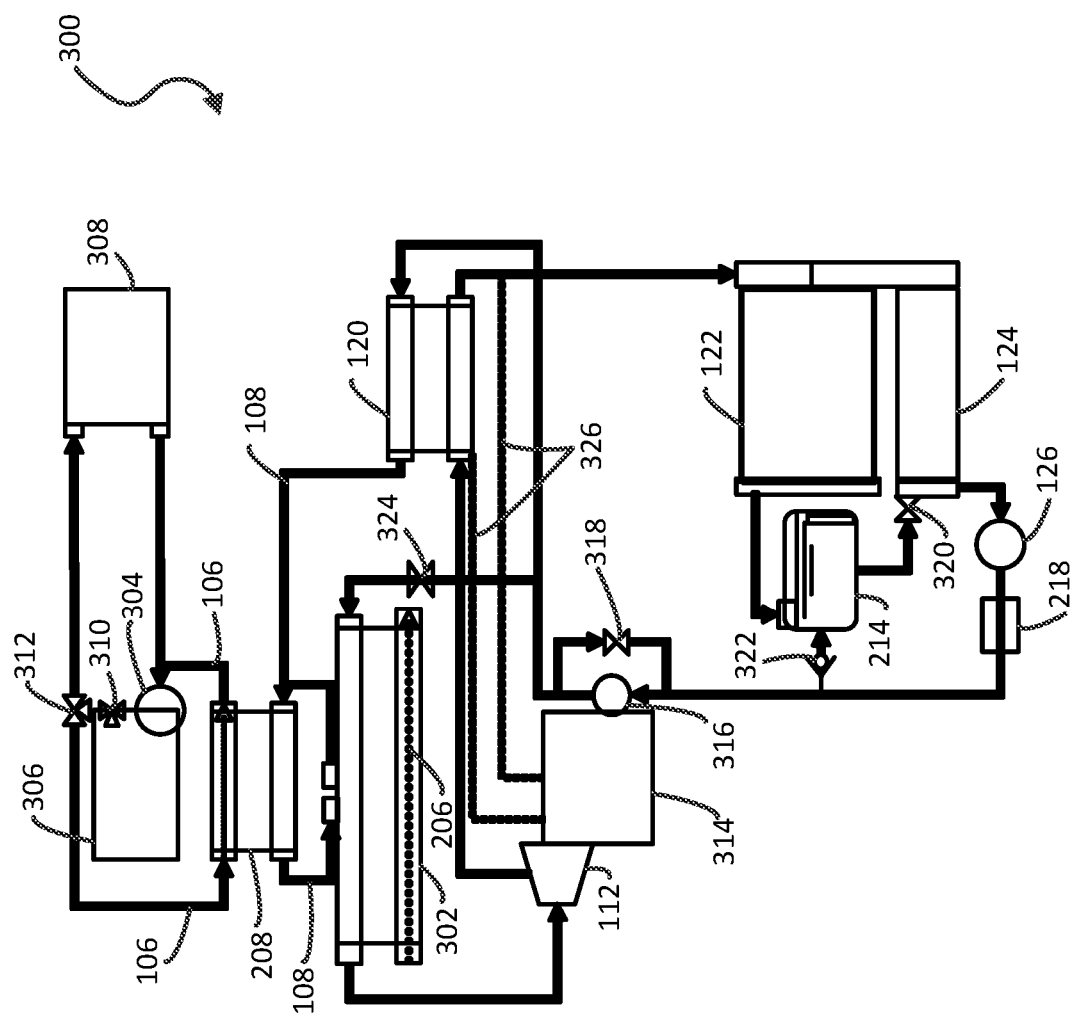
FIG. 3 is a schematic block diagram of a second example of the waste heat recovery system shown in FIG. 1 in accordance with embodiments of the present disclosure.
Figure 4:
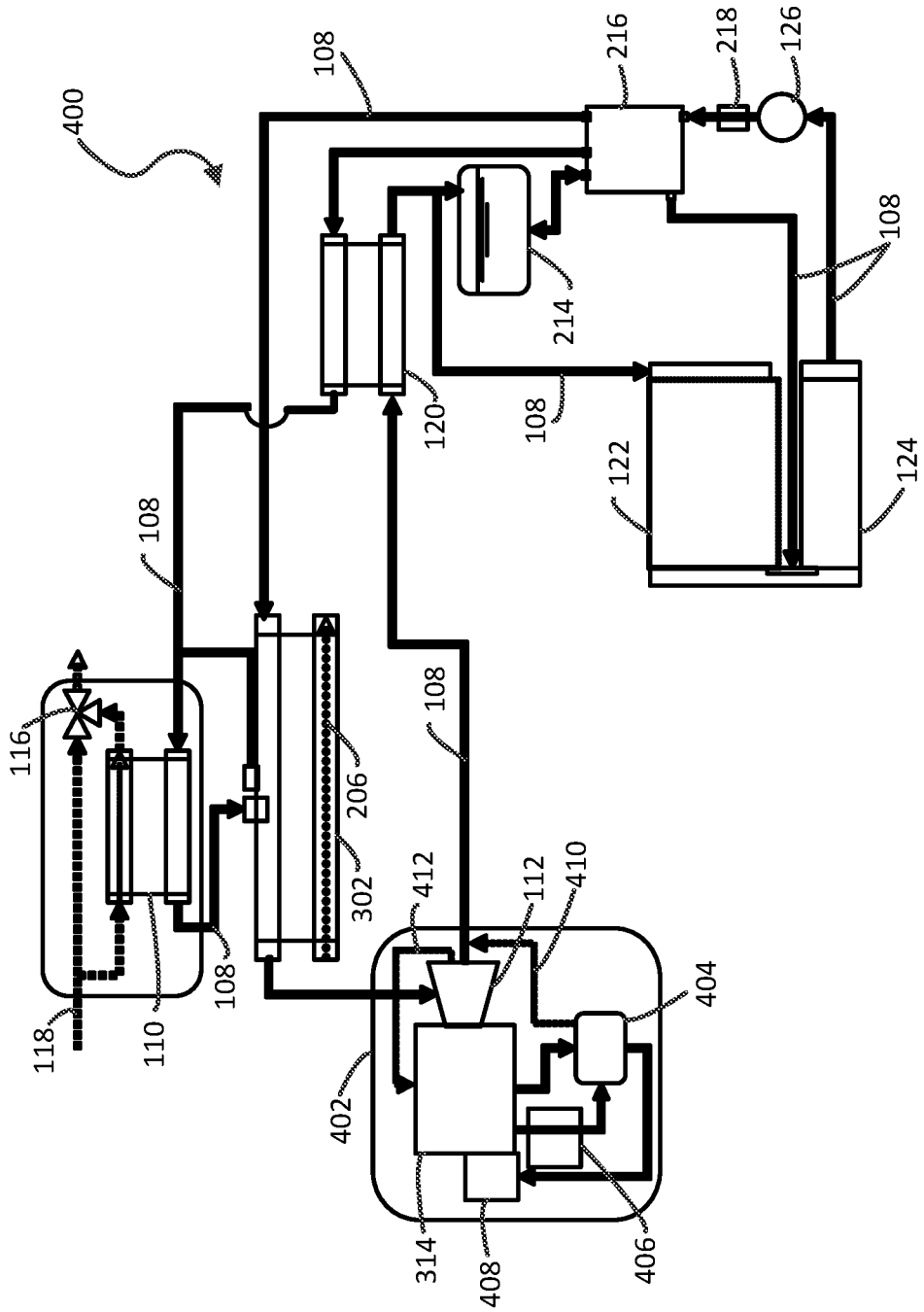
FIG. 4 is a schematic block diagram of a third example of the waste heat recovery system shown in FIG. 1 in accordance with embodiments of the present disclosure.

Also included in system 100 is an optional recuperator 120 configured to receive the expanded working fluid 108 from energy conversion device 112 and communicate at least a portion of the preheated working fluid 108 to heat exchanger 104. Recuperator 120 is fluidically coupled to a condenser 122 (e.g., a multi-pass condenser) and a sub-cooler 124 which is also fluidically coupled to recuperator 120. Condenser 122 and sub-cooler 124 are configured to receive working fluid 108 from recuperator 120 and condense working fluid 108 into a liquid phase. A feed pump 126 is fluidically coupled to sub-cooler 124 and configured to pump working fluid 108 through a liquid circuit of waste heat recovery system 100. Additional examples of waste heat recovery system 100 are shown in FIGS. 2-4 in greater detail.

Figure 2:
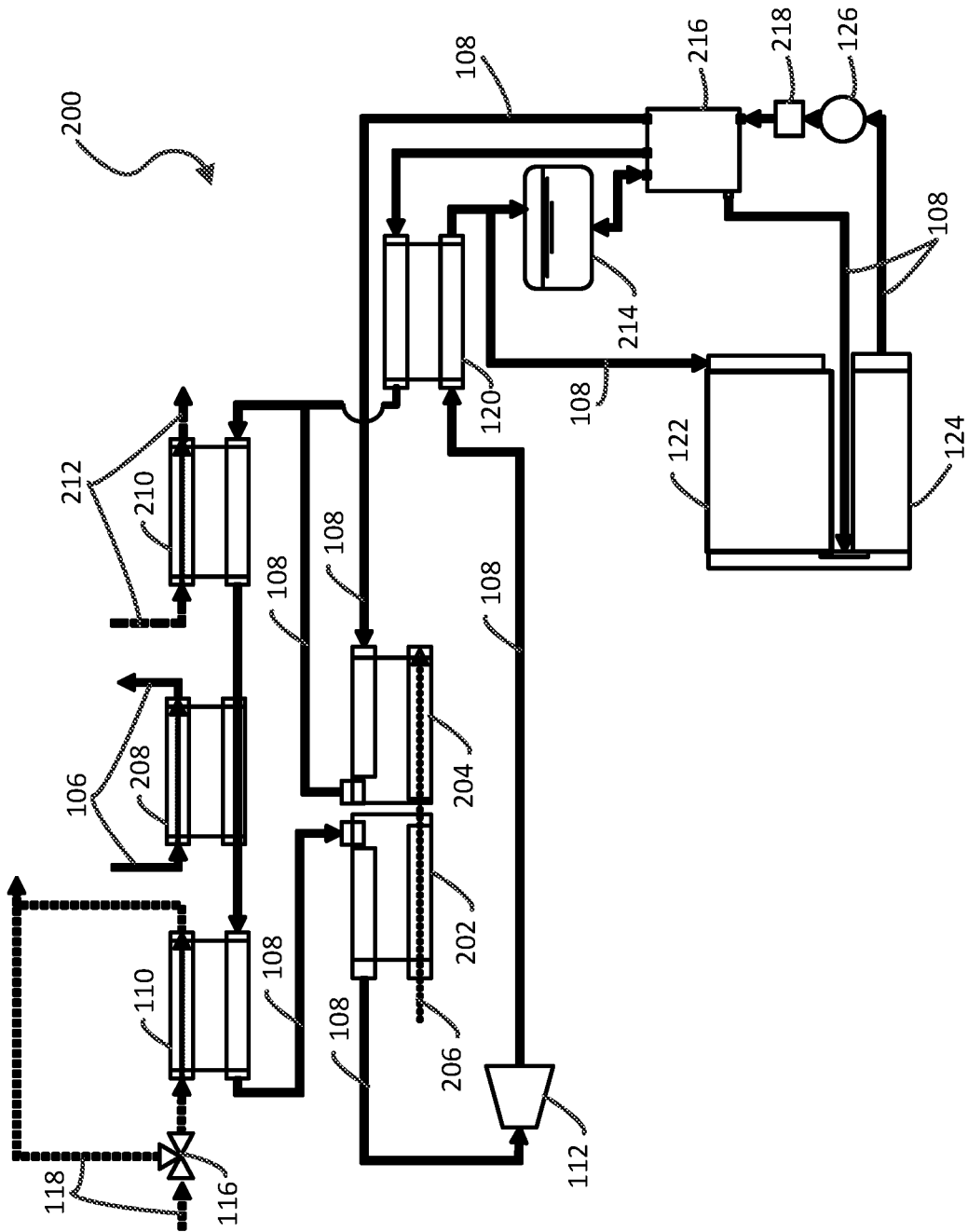
FIG. 2 is a schematic block diagram of a first example of the waste heat recovery system shown in FIG. 1 in accordance with embodiments of the present disclosure.

Referring now to FIG. 2, another exemplary waste heat recovery system 200 according to an embodiment of the present disclosure is shown. Like reference numerals represent like elements shown in FIG. 1. In this example, instead of a single heat exchanger 104 shown in FIG. 1, an EGR superheater 202 and an EGR boiler 204 are fluidically coupled together to extract heat from one or more waste heat sources for preheating or superheating working fluid 108. In one example, EGR superheater 202 and EGR boiler 204 are separate units, but they can be combined into one assembly to suit the application. For example, an EGR gas 206 is received by EGR superheater 202 and communicated into EGR boiler 204 for heat exchange operation. Further, a coolant boiler 208 is fluidically coupled to exhaust boiler 110 and a pre-charge air cooler 210. Coolant boiler 208 is configured to extract heat from coolant 106 to heat working fluid 108. Coolant boiler 208 is also configured to receive preheated working fluid 108 from pre-charge air cooler 210 and deliver working fluid 108 to exhaust boiler 110. Pre-charge air cooler 210 receives a charge air 212 from, for example, a turbocharger (not shown). As such, working fluid 108 is fluidically communicated from pre-charge air cooler 210 to EGR superheater 202 via exhaust boiler 110 and coolant boiler 208. However, an arrangement sequence of pre-charge air cooler 210, coolant boiler 208, and exhaust boiler 110 is variable depending on the application. Other suitable sequences are also contemplated.

In this example, recuperator 120 is configured to receive the expanded working fluid 108 from energy conversion device 112 and communicate at least a portion of the preheated working fluid 108 to pre-charge air cooler 210. Recuperator 120 is fluidically coupled to an elevated receiver 214 and a valve manifold 216. Condenser 122 and sub-cooler 124 are also fluidically coupled to recuperator 120. Condenser 122 and sub-cooler 124 can be configured to receive working fluid 108 from recuperator 120 and/or valve manifold 216, and condense working fluid 108 into a liquid phase. Feed pump 126 is fluidically coupled to sub-cooler 124 and valve manifold 216, and configured to pump working fluid 108 through the waste heat recovery system liquid circuit. A filter 218 is disposed downstream of feed pump 126 and upstream of valve manifold 216. Filter 218 is configured to remove particulates or contaminants from working fluid 108. In some embodiments, a drier is also used in conjunction with filter 218 to suit different applications.

During operation, vaporization of working fluid 108 by exhaust boiler 110, coolant boiler 208, and pre-charge air cooler 210 can reduce the amount of energy required by EGR superheater 202 to heat working fluid 108 such that it completes phase change and superheats. In this arrangement, working fluid 108 can be vaporized in exhaust boiler 110 and EGR superheater 202 can be used only to superheat the vaporized working fluid 108. This may increase the power output of waste heat recovery system 200 and/or allow superheating of working fluid 108 to even higher temperatures, increasing the amount of work that can be extracted by energy conversion device 112 from working fluid 108.

Referring now to FIG. 3, another exemplary waste heat recovery system 300 according to an embodiment of the present disclosure is shown. Like reference numerals represent like elements shown in FIGS. 1-2. In this example, instead of having separate EGR superheater 202 and EGR boiler 204 as shown in FIG. 2, an integrated EGR boiler/superheater 302 is used to extract heat from coolant 106 to heat working fluid 108. Also, waste heat recovery system 300 includes a pump 304 in fluid communication with an engine 306 and a radiator 308 for circulating coolant 106 in the vehicle. In some embodiments, coolant boiler 208 is fluidically coupled to integrated EGR boiler/superheater 302 and engine 306, using a thermostat 310 and a coolant control valve 312. System 300 is configured to selectively recover heat from coolant 106 based on an operating condition of engine 306.

Radiator 308 is configured to receive heated coolant 106 from engine 306 and is further configured to cool coolant 106. Cooled coolant 106 can then be communicated back to engine 306. Radiator 308 can include any suitable radiator, for example, an air cooled radiator. Blowers or fans (not shown) can be used and configured to force air through radiator 308 to cool coolant 106 flowing through radiator 308. Pump 304 is fluidically coupled to engine 306 and configured to pump coolant 106 through engine 306, for example, through an engine block or other housing of engine 306 to cool engine 306. Further, pump 304 is fluidically coupled to radiator 308 to receive cooled coolant 106 from radiator 308.

Thermostat 310 is fluidically coupled to engine 306 and pump 304. Thermostat 310 is configured to direct coolant 106 towards the cooling circuit which includes radiator 308 and coolant boiler 208 when engine 306 has reached a predetermined temperature. For example, thermostat 310 can include a temperature activated valve. When a temperature of engine 306 is below a predetermined engine temperature threshold, for example, at ambient temperature, on an engine startup, a valve of thermostat 310 is closed, blocking any flow of coolant 106 to the cooling circuit and routing coolant flow back into engine 306. This allows engine 306 to warm up rapidly during engine warmup. Once engine 306 reaches or exceeds the predetermined engine temperature threshold (e.g., an operating temperature of about 200 degrees Fahrenheit), the valve of thermostat 310 opens, allowing coolant 106 to flow from engine 306 to the cooling circuit (e.g., radiator and/or coolant heat exchanger).

As discussed above, vaporized working fluid 108 is communicated to energy conversion device 112 which is configured to perform additional work or transfer energy to another device or system. In this example, a turbine assembly 314 is fluidically coupled to energy conversion device 112 and is configured to generate energy or power as a result of expanding working fluid vapor. The generated power can be supplied to the engine's driveline to supplement the engine's power either mechanically or electrically (e.g., by turning a generator), or it can be used to drive a generator and power electrical devices, parasitic devices or a storage battery (not shown). Alternatively, energy conversion device 112 can be used to transfer energy or power from one system to another system.

Another feed pump 316 is fluidically coupled to turbine assembly 314 and configured to pump working fluid 108 to recuperator 120. A bypass valve 318 can also be fluidically coupled to feed pump 316 to bypass the fluid flow of working fluid 108 as shown in FIG. 3. A drain valve 320 is fluidically coupled to subcooler 124 for receiving working fluid 108 from receiver 214. Additional control valves are also contemplated in various locations of the liquid circuit of system 300 to suit different applications. For example, a check valve 322 is configured to selectively redirect working fluid 108 received from subcooler 124 to receiver 214. An EGR temperature valve 324 is configured to selectively redirect working fluid 108 to integrated EGR boiler/superheater 302 based on the temperature of working fluid 108.

For example, EGR temperature valve 324 can include an active thermostat (e.g., a temperature activated valve), or any other active valve. In various embodiments, these control valves include two- or three-way valves depending on applications. Further, one or more oil drain/vapor vent conduits 326 are fluidically coupled to turbine assembly 314 and recuperator 120. In one example, a first conduit 326 fluidically connects turbine assembly 314 to an inlet of recuperator 120. In another example, a second conduit 326 fluidically connects turbine assembly 314 to an outlet of recuperator 120. Other suitable arrangements are also contemplated to suit different applications.

Referring now to FIG. 4, another exemplary waste heat recovery system 400 according to an embodiment of the present disclosure is shown. Like reference numerals represent like elements shown in FIGS. 1-3. In this example, integrated EGR boiler/superheater 302 shown in FIG. 3 is fluidically coupled to exhaust boiler 110 shown in FIG. 1 to extract heat from tailpipe exhaust 118 to heat working fluid 108. An arrangement of recuperator 120, condenser 122, sub-cooler 124, receiver 214, and valve manifold 216 of system 200 shown in FIG. 2 is similarly employed in system 400. One aspect of system 400 is that a turbine/gearbox assembly 402 includes energy conversion device 112, turbine assembly 314, an oil tank 404, an oil cooler 406, and an oil pump/filter 408.

In some embodiments, turbine assembly 314 includes a gearbox and a drive clutch lubricated by gearbox oil, and the gearbox oil is drained into oil tank 404. Oil cooler 406 is fluidically coupled to turbine assembly 314 to receive the gearbox oil and it is communicated into oil tank 404. The received gearbox oil in oil tank 404 is supplied back to turbine assembly 314 using oil pump/filter 408. A gearbox vent conduit 410 fluidly connects oil tank 404 and energy conversion device 112, and an oil scraper line 412 fluidly connects energy conversion device 112 and turbine assembly 314. Other suitable arrangements of components shown in turbine/gearbox assembly 402 are also contemplated to suit different applications.

It is to be understood that the above description is intended to be illustrative, and not restrictive. Many other embodiments will be apparent to those of skill in the art upon reading and understanding the above description. For example, it is contemplated that features described in association with one embodiment are optionally employed in addition or as an alternative to features described in associate with another embodiment. The scope of the present disclosure should, therefore, be determined with reference to the appended claims, along with the full scope of equivalents to which such claims are entitled.

What is claimed is:

1. A waste heat recovery system (100) of a vehicle, comprising:
   at least one heat exchanger (104) fluidically coupled to a waste heat source (102) associated with the vehicle and configured for selectively recovering heat from the waste heat source (102) to heat a working fluid (108);
   at least one energy conversion device (112) fluidically coupled to the at least one heat exchanger (104) and configured to receive the working fluid (108) and to generate an energy for performing work or transferring the energy to another device using the heat recovered from the waste heat source (102);
   a condenser (122) fluidically coupled to the at least one energy conversion device (112) and configured to receive the working fluid (108) from the at least one energy conversion device (112) and to condense the working fluid (108) into a liquid phase;
   a recuperator (120) fluidically coupled to the at least one energy conversion device (112) and configured to receive the working fluid (108) from the at least one energy conversion device (112) and to communicate at least a portion of the working fluid (108) to the at least one heat exchanger (104); and
   an exhaust boiler (110) fluidically coupled to the at least one heat exchanger (104) and configured to receive the working fluid (108) from the at least one heat exchanger (104) and to evaporate the working fluid (108) and communicate the evaporated working fluid (108) to the at least one energy conversion device (112);
   wherein the exhaust boiler includes a plurality of microtubes, and the condenser (122) is fluidically coupled to a sub-cooler (124) which is fluidically coupled to the recuperator (120).

2. The waste heat recovery system (100) of claim 1, wherein the at least one energy conversion device (112) provides an electric or mechanical power using the generated energy.

3. The waste heat recovery system (100) of claim 1, wherein the at least one energy conversion device (112) includes at least one of: a piston expander, a screw expander, a scroll expander, a gerotor expander, and a turbine expander.

4. The waste heat recovery system (100) of claim 1, wherein the at least one energy conversion device (112) includes at least one of: a plurality of working fluid inlets and a plurality of working fluid outlets.

5. The waste heat recovery system (100) of claim 1, wherein the working fluid (108) includes at least one of: water, ethanol, toluene, ethylene glycol, water and ethylene glycol mixture, oil, R245fa, low GWP replacements for R245fa, R1233zd(e), other hydrocarbon based working fluid, other hydrofluorocarbon based working fluids, oil, any mixtures of these working fluids.

6. The waste heat recovery system (100) of claim 1, wherein the waste heat source (102) includes at least one of: an exhaust, a recirculated exhaust (EGR), a coolant, a lubricant, and a charge air.

7. The waste heat recovery system (100) of claim 1, wherein the exhaust boiler (110) is configured to extract the heat from an exhaust generated from an after-treatment device (114) to heat the working fluid (108).

8. The waste heat recovery system (100) of claim 1, wherein the recuperator (120) includes a plurality of microtubes.

9. The waste heat recovery system (100) of claim 8, wherein the recuperator (120) is fluidically coupled to the condenser (122), the at least one energy conversion device (112), and the at least one heat exchanger (104).

10. The waste heat recovery system (100) of claim 8, wherein the sub-cooler (124) is fluidically coupled to the recuperator (120) via a feed pump (126).

11. A waste heat recovery system (200) of a vehicle, comprising:
an exhaust gas recirculation (EGR) superheater (202) and an EGR boiler (204), both being fluidically coupled together to a waste heat source (102) associated with the vehicle and configured for selectively recovering heat from the waste heat source (102) to heat a working fluid (108);
at least one energy conversion device (112) fluidically coupled to the EGR superheater (202) and the EGR boiler (204), and configured to receive the working fluid (108) and to generate an energy for performing work or transferring the energy to another device using the heat recovered from the waste heat source (102);
a condenser (122) fluidically coupled to the at least one energy conversion device (112) and configured to receive the working fluid (108) from the at least one energy conversion device (112) and to condense the working fluid (108) into a liquid phase and
an exhaust boiler (110) fluidically coupled to the EGR superheater (202) and the EGR boiler (204), the exhaust boiler (110) being configured to recover heat from an exhaust and includes a plurality of microtubes;
wherein at least one of the EGR superheater (202) and the EGR boiler (204) also includes a plurality of microtubes.

12. The waste heat recovery system (200) of claim 11, wherein heat from a coolant (106) is recovered by a coolant boiler (208), and heat from a charge air (212) is recovered by a charge cooler or a pre-charge air cooler (210).

13. The waste heat recovery system (200) of claim 12, wherein the working fluid (108) is fluidically communicated from the pre-charge air cooler (210) to the EGR superheater (202) via the exhaust boiler (110) and the coolant boiler (208).

14. The waste heat recovery system (200) of claim 12, further comprising a recuperator (120) fluidically coupled to the at least one energy conversion device (112) and configured to receive the working fluid (108) from the at least one energy conversion device (112) and to communicate at least a portion of the working fluid (108) to the condenser (122).

15. A waste heat recovery system (400), comprising:
an integrated exhaust gas recirculation (EGR) boiler/superheater (302) fluidically coupled to an exhaust boiler (110) configured for selectively recovering heat from a tailpipe exhaust (118) to heat a working fluid (108);
at least one energy conversion device (112) fluidically coupled to the integrated EGR boiler/superheater (302) and configured to receive the working fluid (108) and to generate an energy for performing work or transferring the energy to another device; and
a condenser (122) fluidically coupled to the at least one energy conversion device (112) and configured to receive the working fluid (108) from the at least one energy conversion device (112) and to condense the working fluid (108) into a liquid phase;
wherein the exhaust boiler (110) includes a plurality of microtubes.

16. The waste heat recovery system (400) of claim 15, further comprising a turbine assembly (314) fluidically coupled to the at least one energy conversion device (112) and configured to generate the energy using the working fluid (108).

17. The waste heat recovery system (400) of claim 16, wherein the turbine assembly (314) includes a gearbox and a drive clutch, and is fluidically coupled to at least one of: an oil tank (404), an oil cooler (406), and an oil pump (408).

18. The waste heat recovery system (400) of claim 15, wherein the integrated EGR boiler/superheater (302) includes a plurality of microtubes.

* * * * *